July 29, 1941.   G. MANIERRE   2,250,933
LOADING CONVEYER
Filed Feb. 13, 1939   9 Sheets-Sheet 1

Fig. 1.

Inventor.
George Manierre
Daniel Brennan
Attorney

July 29, 1941.　　　　G. MANIERRE　　　　2,250,933
LOADING CONVEYER
Filed Feb. 13, 1939　　　　9 Sheets-Sheet 8

Inventor
George Manierre
Daniel Brennen
Attorney

Patented July 29, 1941

2,250,933

UNITED STATES PATENT OFFICE 2,250,933

LOADING CONVEYER

George Manierre, Milwaukee, Wis.

Application February 13, 1939, Serial No. 256,038

15 Claims. (Cl. 198—92)

The invention relates to conveyer machines and particularly to a novel universally flexible conveyer-loader embodying means to insure uninterrupted, safe and positive conveyance of articles, such as bags, barrels, boxes, etc., from its loading end to the discharge end.

An object of the invention is to provide a conveyer machine of the character referred to with a plurality of sections independently and freely movable relative to each other without necessitating any interruption in the operation of a cooperative universally flexible chain-conveyer.

Another object is to provide an improved pivot connecting said sections whereby the machine may be moved readily through and around the door opening of a box car.

Another object is to provide means to control the turning of pivotally mounted trucks supporting said sections.

Another object is to provide the conveyer machine with remote control power operated driving means on some of the sections to effect efficient and substantially uniform movement of all the sections.

Another object is to provide a plurality of pivotally connected sections, with novel means to guide an endless universally flexible chain-conveyer over substantially its entire length to prevent said chain-conveyer from buckling, twisting, kinking, binding, or warping, thus insuring uninterrupted safe conveyance of an article to its discharge end.

Another object is to provide a flexible conveyer machine of the character described with novelly constructed guide rollers yieldably mounted to insure their retention in guide tracks.

Another object is to provide a conveyer frame with a plurality of rigid and vertically flexible sections arranged alternately and pivotally connected end to end for relative movement angularly through a horizontal plane.

Another object is to provide a universally flexible conveyer machine with a normally elevated discharge end constructed so that it can be readily lowered to pass freely beneath a supply chute operatively associated therewith.

The foregoing and such other objects of the invention as will appear hereinafter, will be more readily understood from a perusal of the following specification, in which reference will be made to the accompanying drawings, wherein:

The improved conveyer machine illustrated, is designed primarily to afford means for conveying packages, such as boxes, bags, barrels, etc., into a box car or other enclosures, for convenient discharge adjacent the point of stacking. To accomplish this, various types of similar loading equipment have been used, but such known machines have developed various objectional characteristics, some of which are: lack of proper means for moving and guiding the equipment into and out of cars, lack of universal adaption to various operating and loading conditions and lack of conveyer frame and chain-conveyer flexibility. In machines having a limited degree of flexibility some of the objectional characteristics are lack of means either in the structure of the chain-conveyer, or in the various sections, to prevent buckling, twisting, binding, and warping of the chain-conveyer at the points of turning principallly. The improved machine is designed particularly to and does overcome said objections. Its flexible chain-conveyer freely travels its entire length without twisting, buckling, binding or warping and thus insures its safe, smooth and continuous movement. This feature, together with other improvements and advantages, will become more readily understood as the description of the detail structure proceeds.

Figure 1:
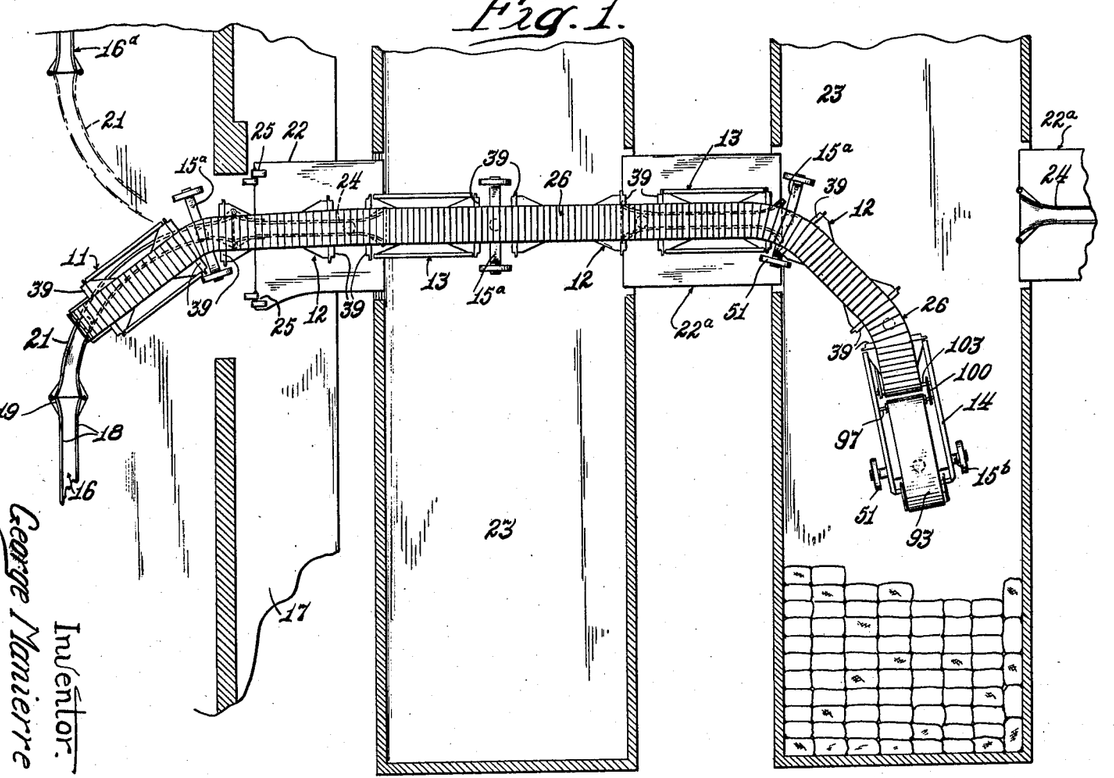
Fig. 1 is a plan view of the conveyer machine showing it is one of its positions of use.
Figure 2:
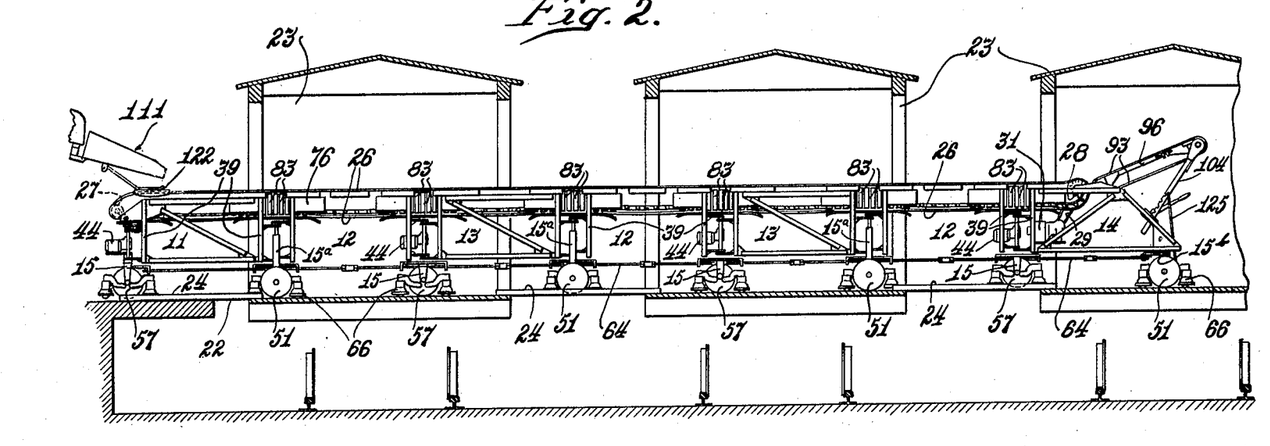
Fig. 2 is a view showing the machine in elevation.

The conveyer machine, illustrated as a whole in Figs. 1 and 2, includes a flexible frame consisting of a rear or loading section 11, intermediate sections 12 and 13, and a front or discharge section 14. Each section is pivotally connected with the adjacent section for horizontal movement to impart limited flexibility to the frame as a whole, and each section preferably is supported at one end by suitable trucks 15 or 15a pivotally mounted in vertical alignment with a vertical pivotal connection between said sections. A similar truck 15b supports the front end of the discharge section 14.

As best shown in Fig. 1 a track 16, provided on the loading platform 17, preferably consists of a shallow built-up channel having vertical flanges 18. One end of the guide track preferably is flared, as at 19 to join a similarly constructed track portion 21. A hingedly mounted plate 22 bridges the gap between the loading platform 17 and the floor of a box car 23 to provide a runway for the wheels of the truck of the conveyer machine. A guide track 24 also is provided on the plate 22. When the loading machine is withdrawn from the car, the plate 22 may be swung upwardly, about its pivotal mountings 25, free of the car. Similar guide plates 22a bridge the gap between adjacent cars whereby the conveyer machine may be moved therein to successively load said cars.

Manually controlled power operated means is provided to move the conveyer machine into and out of the cars, and will be more fully explained hereafter. After the machine is moved into one far end of a car, it can be backed out intermittently as the car end is loaded. After one end of the car is loaded, the conveyer machine is moved into the other end and, as the loading progresses, is gradually backed out. The center of the car then is loaded, as the conveyer machine is being progressively withdrawn.

Referring especially to Figs. 1 to 4 inclusive, an endless chain-conveyer 26 is carried on the flexible conveyer frame and extends substantially from end to end. As best shown in Fig. 2, the loading section 11 of the frame carries an idler sprocket 27 at its rear end and a driven sprocket 28 (Fig. 6) is journalled on the front or discharge section 14 for carrying the chain-conveyer 26. The sprocket 28 is driven through chain 29 (Figs. 2 and 6) by a motor 31 mounted on the front section 14.

Figures 3, 4:
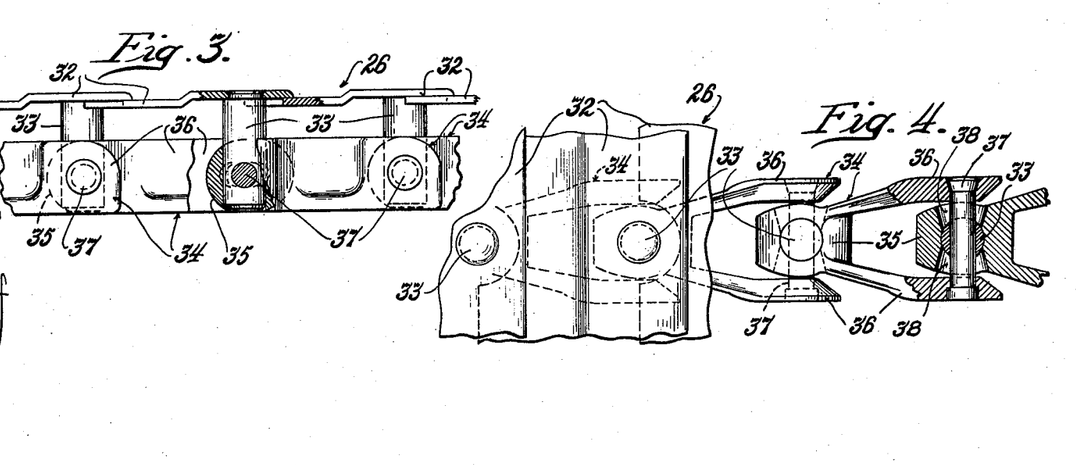
Fig. 3 is a fragmentary side elevational view of the chain-conveyer.
Fig. 4 is a fragmentary plan view of the chain-conveyer, showing parts broken away and other parts in section.

As previously noted, the conveyer frame is universally flexible hence the chain-conveyer 26 also must be universally flexible to afford uninterrupted operation thereof with a minimum amount of friction. As best illustrated in Figs. 3 and 4, the chain-conveyer consists of a plurality of substantially rectangular flights 32 each offset longitudinally to partly underlie the next adjacent flight, thereby providing a relatively smooth flight surface. A pintle 33 is rigidly secured to and extends below each flight 32. Links 34, constituting the chain, are each substantially V-shaped and each includes an apex portion 35 and two diverging arm portions 36. The apex portion of each link is apertured to receive one of the pintles 33 and, when thus mounted, the arm portions 36 embrace the apex portion of the adjacent link. A cross-pin 37 is secured in each pintle 33 and extends through elongated openings 38 in the associated apex portion. In this manner, the cross pin 37 retains the apex of the link on the pintle 35 and provides a pivotal mounting for the embracing arm portions, as shown. Obviously, the chain-conveyer 26 has universal flexibility to a sufficient degree to allow free movement of the chain-conveyer about any curvature assumed by the universally flexible conveyer frame.

Horizontal flexibility is imparted to the conveyer frame through the pivotal connection between each of its sections. As best shown in Figs. 1, 5, 8 and 9, the loading and intermediate sections 11, 12 and 13, and the rear end of the front or discharge section 14, each include front and rear end-frames 39. Each end frame 39 preferably constitutes a substantially rectangular web-like structure having vertically aligned spaced apart horizontal bearing flanges 41 integral with and extending outwardly therefrom. When the sections are placed end to end the bearing flanges 41 of opposed end frames 39 of adjacent sections, co-act to provide means to pivotally connect said adjacent sections.

The loading section 11 and the intermediate sections 13 are rigid, the end frames 39 thereof being connected by upper and lower angles 42 and tie angles 43. The intermediate sections 12 are semi-rigid, that is, the end frames 39 thereof are joined together at their upper ends only, in a manner and for a purpose to be described hereinafter. It should be obvious, at this time, that any desired number of intermediate sections 12 and 13 can be joined in making a conveyer frame of any desired length.

Figure 8:
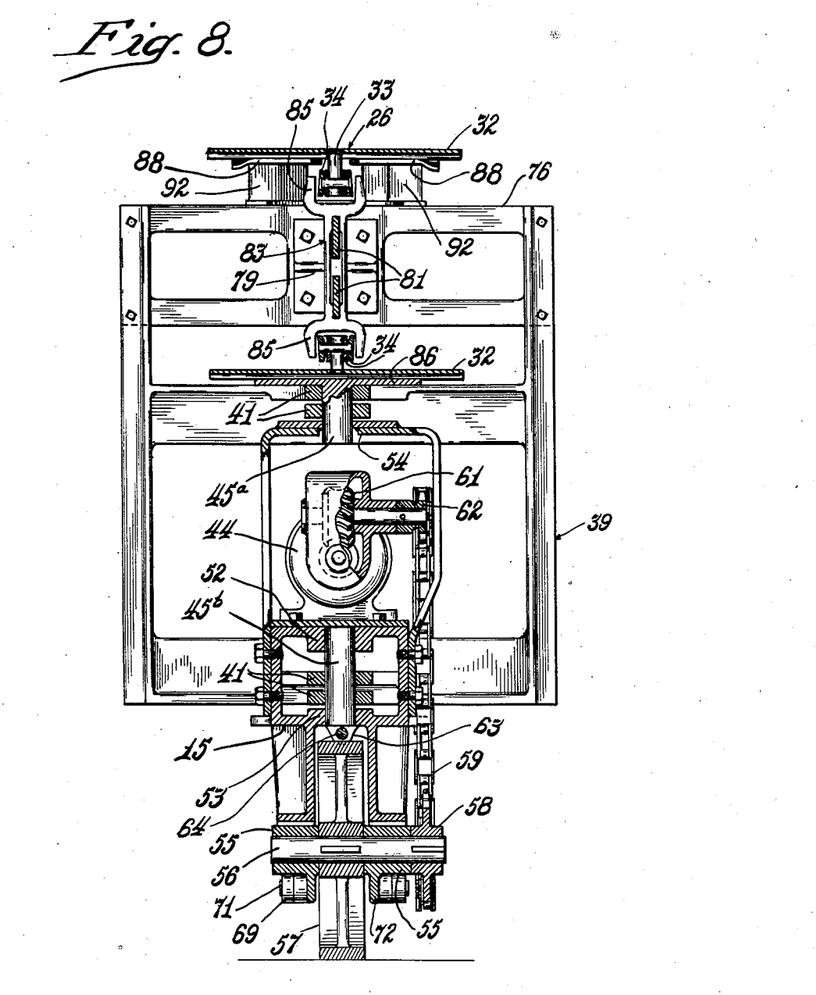
Fig. 8 is a vertical sectional view, taken on line 8—8 of Fig. 5.

Movement of the conveyer frame, as a unit, into various positions, is effected by power operated means such as motors 44, one of which preferably is carried on each alternate truck 15 (Fig. 8). The intermediate trucks 15a (Fig. 9) and the truck 15b, at the discharge end of the conveyer frame, are idler trucks and, because of structural differences in the power and idler trucks, the connections between adjacent sections (11 to 14) differ slightly.

Figure 9:
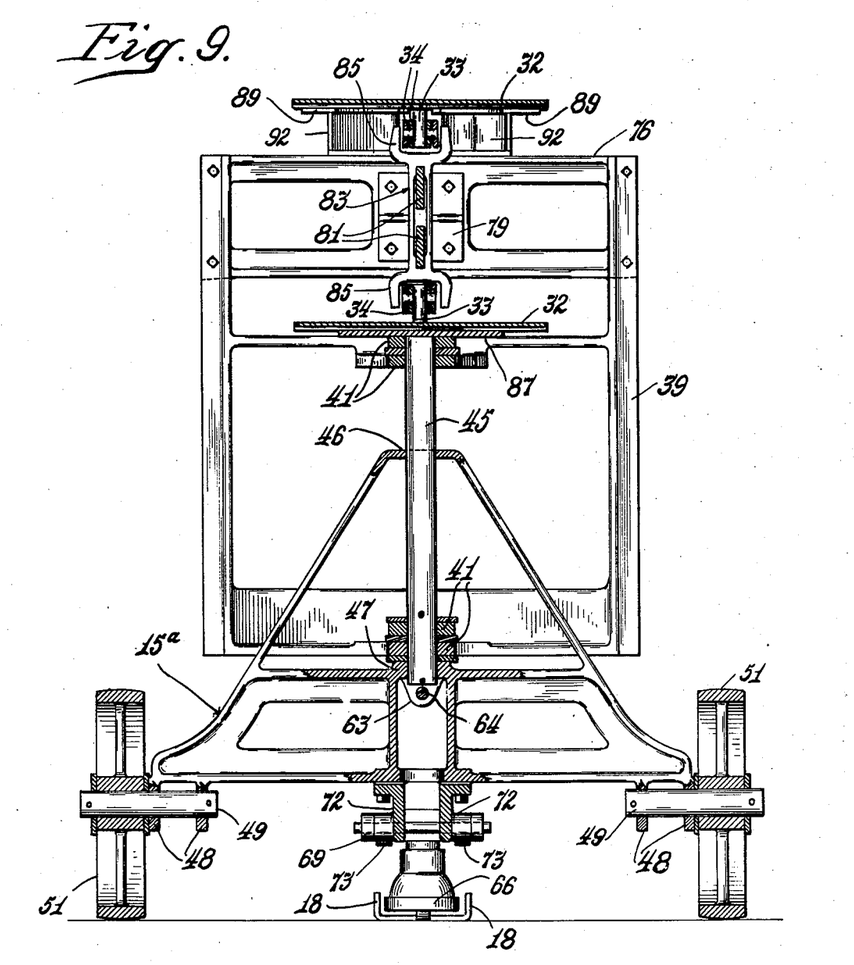
Fig. 9 is a vertical sectional view, taken on line 9—9 of Fig. 5.

In the idler trucks the bearing flanges 41 of the opposed sections are pivotally connected by a vertical shaft 45, (as best shown in Fig. 9).

In the power trucks, the bearing flanges 41 of opposed sections are pivotally connected by vertically aligned separate shafts 45a and 45b, (as best shown in Fig. 8). Accordingly the idler and power trucks are journalled one in axial alignment with the pivotal connection between the associated sections. As shown, each idler truck 15a (Fig. 9) has vertically spaced apart aligned bearings 46 and 47 journalled on shaft 45. Said trucks 15a preferably flare outwardly to provide spaced apart horizontally aligned bearings 48 each arranged to receive a stud shaft 49 upon which an idler wheel 51 is mounted. The idler truck 15b, on the discharge end of the machine, is journalled in a bracket 126 and carries two rollers 127 on its upper side which bear against a bottom plate 128 on the front section 14 to prevent tilting.

Each power truck (Fig. 8) has vertically spaced bearings 52 and 53 journalled on the lower shaft 45b and a built-up reinforcing guide bearing 54 journalled on the upper shaft 45a. Each power truck 15 includes spaced apart, depending horizontally, aligned bearings 55 for a driven shaft 56 which carries a wheel 57 between said bearings. The shaft 56 protrudes beyond one of said bearings and has a sprocket 58 keyed or otherwise secured thereon over which is trained a drive chain 59 operated by motor 44 through reduction gearing and driven sprocket 62.

Accordingly, each truck 15, 15a or 15b is mounted for pivotal movement about a vertical axis.

As all the motors 44 are electrically connected for simultaneous starting and stopping, the conveyer frame is moved into various positions easily and quickly without placing any single section thereof under a drag irrespective of the angular position of any section relative to adjacent sections. Location of a motor truck at the rear or loading end of the conveyer frame and at the rear end of each rigid section 13 and the front section 14, provides, in effect, a pusher drive whereby the machine is pushed or urged into various positions rather than pulled. This obviously relieves all sections and particularly the semi-rigid sections 12, of any undue strain which might be occasioned were a single power source provided at the front end only of the machine.

Figures 10, 11, 12:
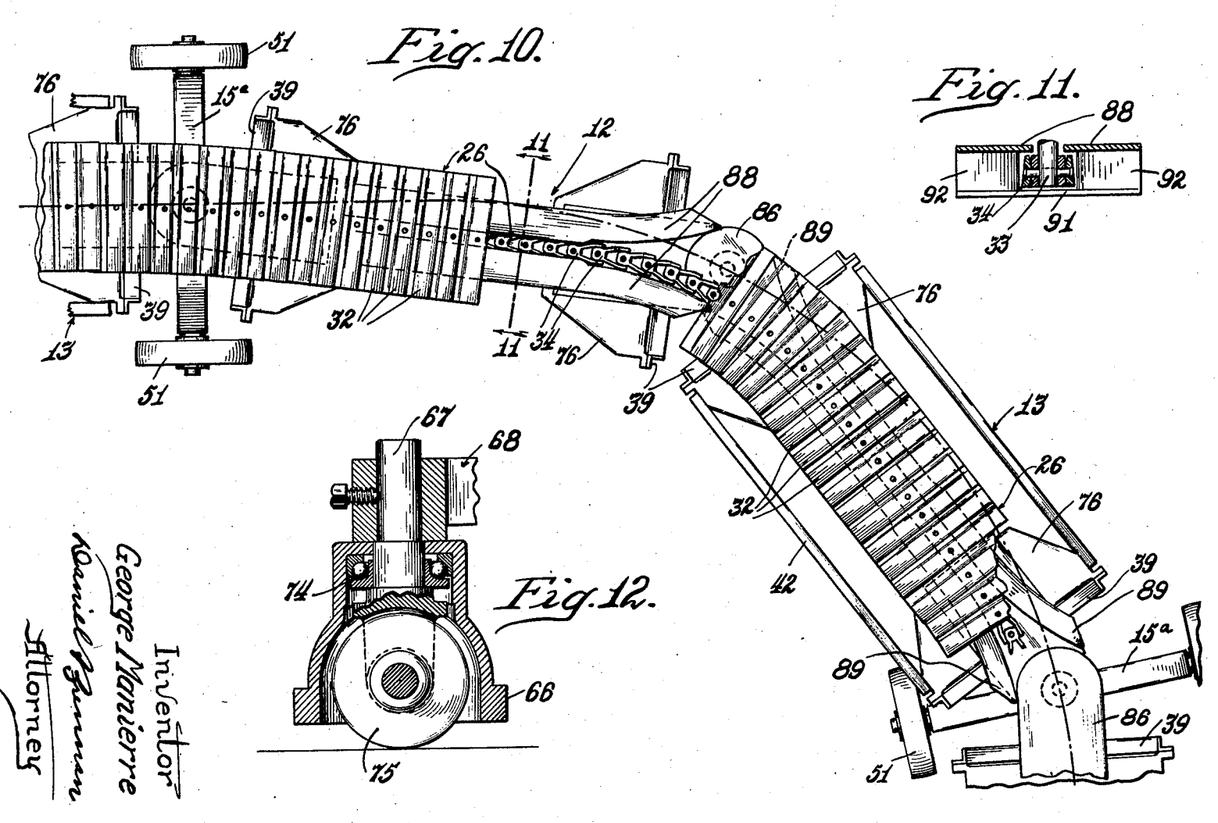
Fig. 10 is a fragmentary plan view of the conveyer machine.
Fig. 11 is a sectional view taken on line 11—11 of Fig. 10.
Fig. 12 is a detail view of one of the guide rollers.
Figure 14:
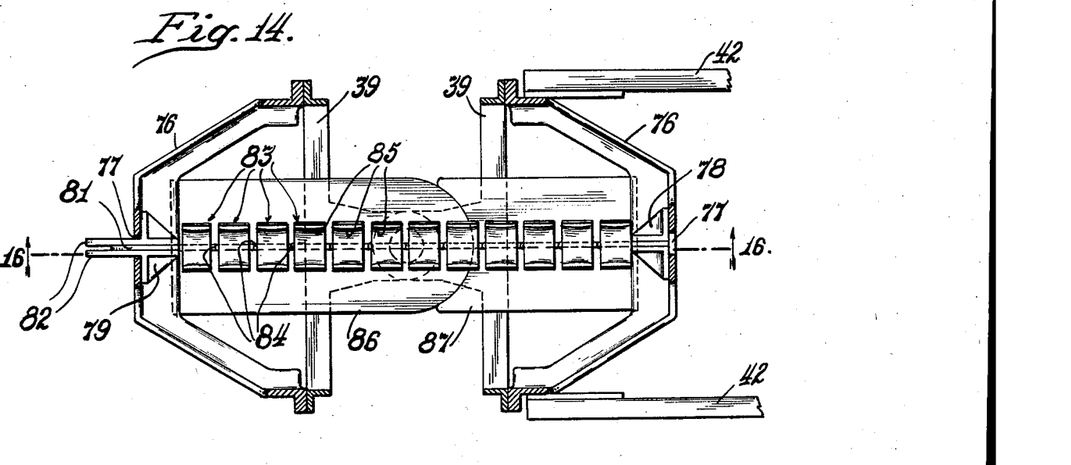
Fig. 14 is a horizontal sectional view taken on line 14—14 of Fig. 5, showing parts in elevation.

Upon reference to Figs. 1 and 10, it will be noted that while the sections are moving around a curve, and are thus angularly disposed to each other, the trucks 15, 15a and 15b pivot about one-half the amount of the curve between its adjacent sections. Control of the degree, at which the trucks pivot, is essential to prevent jamming or dragging such as might occur should one truck pivot too much or too soon and another truck not pivot at all or have a delayed pivoting. Obviously, it would be impossible to satisfactorily control the direction of movement of the horizontally flexible conveyer frame were the trucks free to pivot without control.

One means to control pivotal movement of the trucks is best illustrated in Figs. 1, 5, 8 and 9. As shown, each truck has a pair of longitudinally aligned spaced apart depending apertured lugs 63. A spring steel rod 64, preferably built-up of sections joined by clamps 65 (Figs. 1 and 5) extends substantially the entire length of the conveyer frame through the lugs 63. Its forward end preferably is anchored in the lug 63a on a rearwardly extending plate 63b which is pivoted on the axis of truck 15b whereby said rod is free to shift longitudinally in the lugs on the remaining trucks. When the machine is moving in a straight line, the rod 64 maintains the trucks at right angles to the direction of travel, but while making a turn, the rod 64 bows and, because each truck 15 and 15a is slidably guided at two widely spaced apart points along said rod, said trucks are positively pivoted a distance equal to one-half the angular relation of its adjacent sections. The rod 64 also prevents the trucks from being jarred out of alignment upon striking an obstruction on the supporting surface. In such an event, the trucks may be momentarily thrust out of alignment but they are forcibly carried over the obstruction and immediately resume their normal aligned position.

The conveyer frame is further assisted in traveling along a predetermined path by the tracks 16, 24, etc., having spaced vertical flanges 18, between which horizontally disposed guide rollers 66 (Figs. 5, 12 and 13) are adapted to travel.

Figures 5, 13:
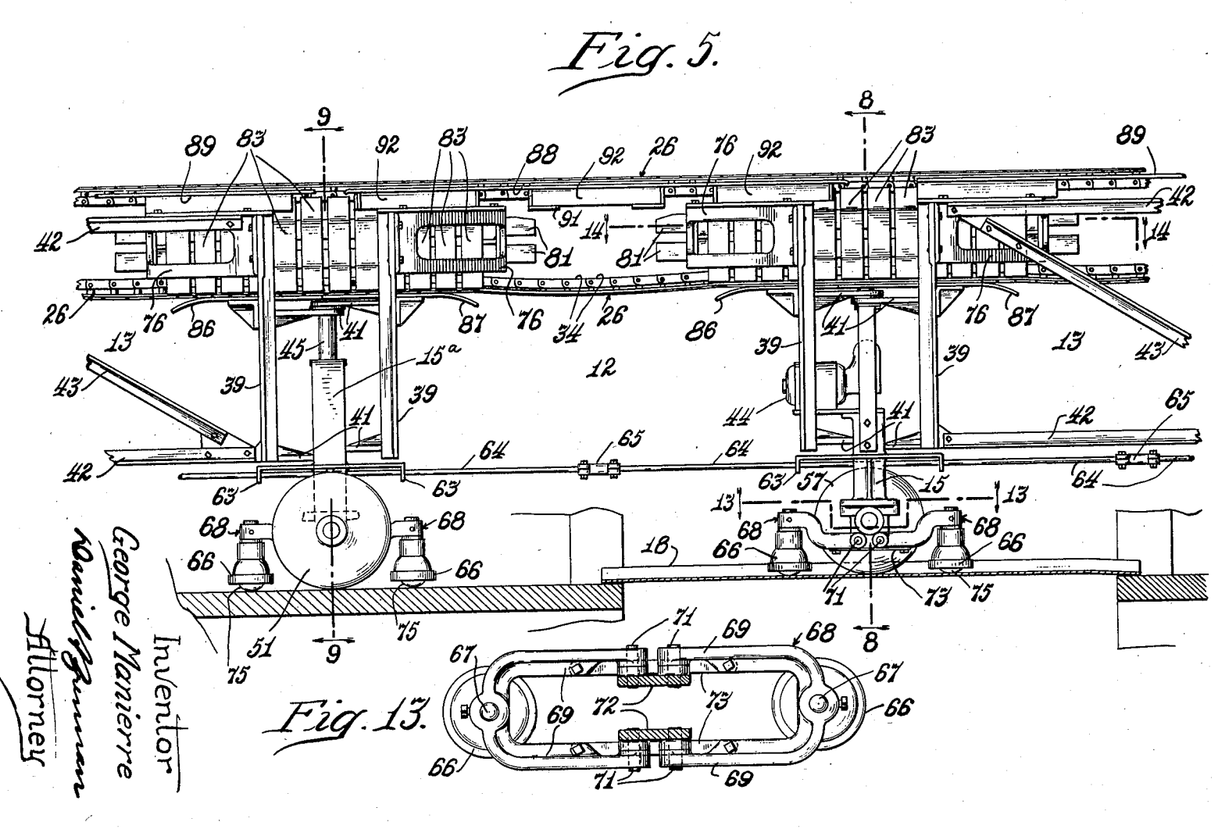
Fig. 5 is a side elevational view of an intermediate portion of the machine.
Fig. 13 is a sectional plan of the guide roller mounting, taken on line 13—13 of Fig. 5.

As best illustrated in Figs. 5 and 13, each truck has two guide rollers 66, each carried on a vertical stud shaft 67 rigidly mounted at one end in a substantially horizontally disposed bracket 68. Forked arms 69, on said brackets, are pivotally mounted at their ends as at 71 to apertured ears 72 on the trucks. The ears 72 are integral with wheel bearings 55 on the power trucks (Fig. 8) and are bolted or otherwise secured to the idler trucks 15a (Fig. 9).

In either event, the two forked brackets 68 on each truck extend in opposite directions and are yieldably connected by leaf springs 73 whereby they normally are held parallel horizontally, but may readily swing vertically to commensurate for any momentary variation in the elevation of the supporting surface. The springs 73 also retain the rollers 66 between the spaced guide flanges 18 and prevent them from jumping out.

Although various types of rollers 66 may be suitable as guides, it is preferable to use a structure such as is best illustrated in Fig. 12. As shown, the roller 66 consists of a substantially bell-shaped housing containing anti-friction bearings 74, or the like, adjacent its upper end. The lower end of the vertical stud shaft 67 preferably is forked to receive a supporting roller 75 which rolls along the supporting surface.

From the foregoing it is apparent that a horizontally pivoted, flexible conveyer frame embodies adequate means to insure tracking of the various sections without placing any single section under undue strain. This uniform distribution of the pulling force is due primarily to the location of the motivating power and to adequate radial and directional control of the supporting trucks.

Smooth, unhampered movement of the endless chain-conveyer 26 along the entire length of the conveyer frame is obtained by providing novel means of limited flexibility to support and guide the chain-conveyer from one section to the other irrespective of the angular disposition of adjacent sections.

As best illustrated in Figs. 5, 8, 9 and 14 to 16, inclusive, the chain-conveyer guide means includes a pair of horizontally opposed substantially U-shaped brackets 76 rigidly mounted upon the inside face of the upper end portion of each hingedly connected end frame 39. Each bracket 76 has its back wall slotted as at 77, and has an angle fitting 78 or 79 secured on the inside face of its back wall. The fitting 78 snugly receives one end of each of a pair of spring steel strips 81. The strips 81 are secured in said fitting preferably by welding and they bridge the gap between adjacent frame sections and slidingly extend through the other angle fitting 79 and slot 77 on the opposed bracket 76. Preferably, the fitting 79 has rearwardly projecting reinforcing flanges 82 also extending through slots 77.

Figures 15, 16:
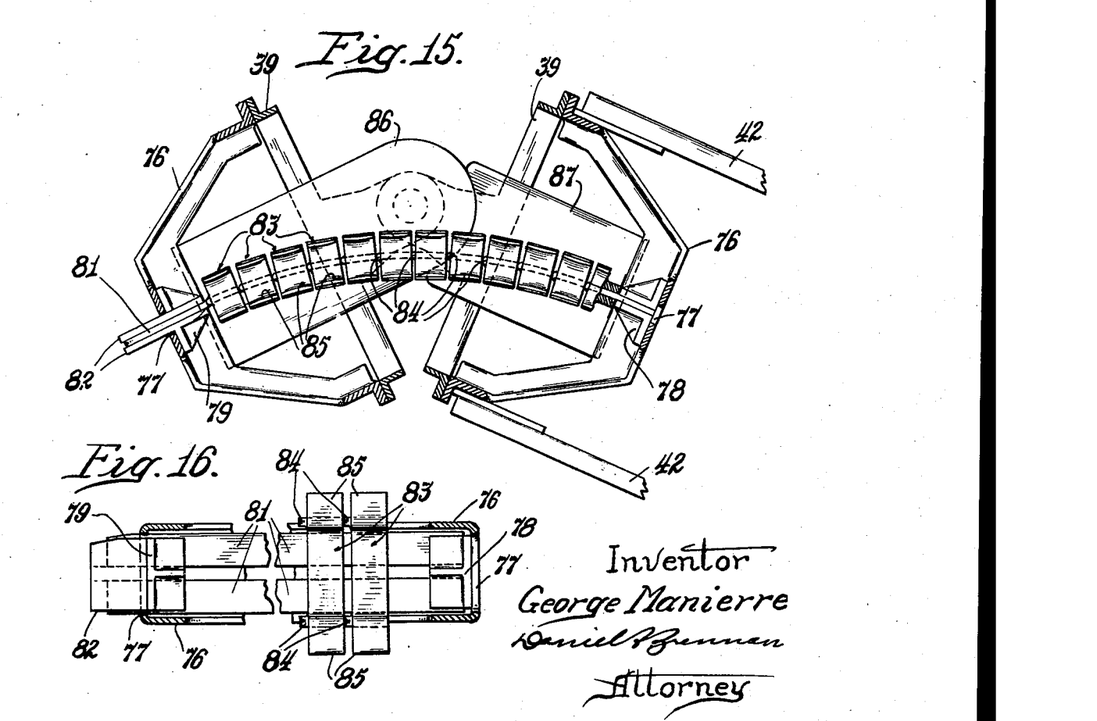
Fig. 15 is a view similar to Fig. 14, showing the adjacent sections in an angular position.
Fig. 16 is a fragmentary sectional view taken on line 16—16 of Fig. 14, showing parts in elevation.

A plurality of chain guide elements 83 are slidably mounted upon the strips 81. These elements each preferably are held spaced apart slightly by lugs 84 on one face thereof so that when the frame sections are angularly disposed, as when the conveyer frame is making a turn, sufficient clearance is present between said elements to allow bowing of the strips 81, as shown in Fig. 15. The guide elements 83 have forked ends 85 providing a flexible channel to receive and guide the upper or delivery flight of the chain-conveyer 26 and to guide the lower or return flight, between adjacent sections. The return flight of the chain-conveyer is supported across the gap between the hinged sections by drag plates 86 and 87.

The delivery flight of the chain-conveyer is supported, during its travel along and between the sections, by suitable bed plates 88 and 89 respectively, preferably made of strips of spring steel, as best illustrated in Figs. 5 and 8 to 11. The bed plates 88 on the semi-rigid sections 12 preferably are reinforced at intervals along their lengths by built up box-like structures consisting of a base wall 91 connected to bed plates 88 by vertical reinforcing walls 92.

As best shown in Fig. 5, the plates 88 provide the only connection between the end frames of 39 of sections 12 and accordingly, said sections are free to flex vertically to compensate for any variation in the level of the supporting surface. The bed plates 89 on the alternate sections 11, 13 and 14 are prevented from flexing due to the rigid construction of those sections.

Referring to Fig. 10, it will be noted that the bed plates 88 and 89 diverge transversely as they approach the hingedly connected ends of their respective sections. This divergence allows transverse movement of the chain-conveyer 26 relative to the sections at the hinge connections where the chain-conveyer is guided by the elements 83.

Figures 6, 7, 19:
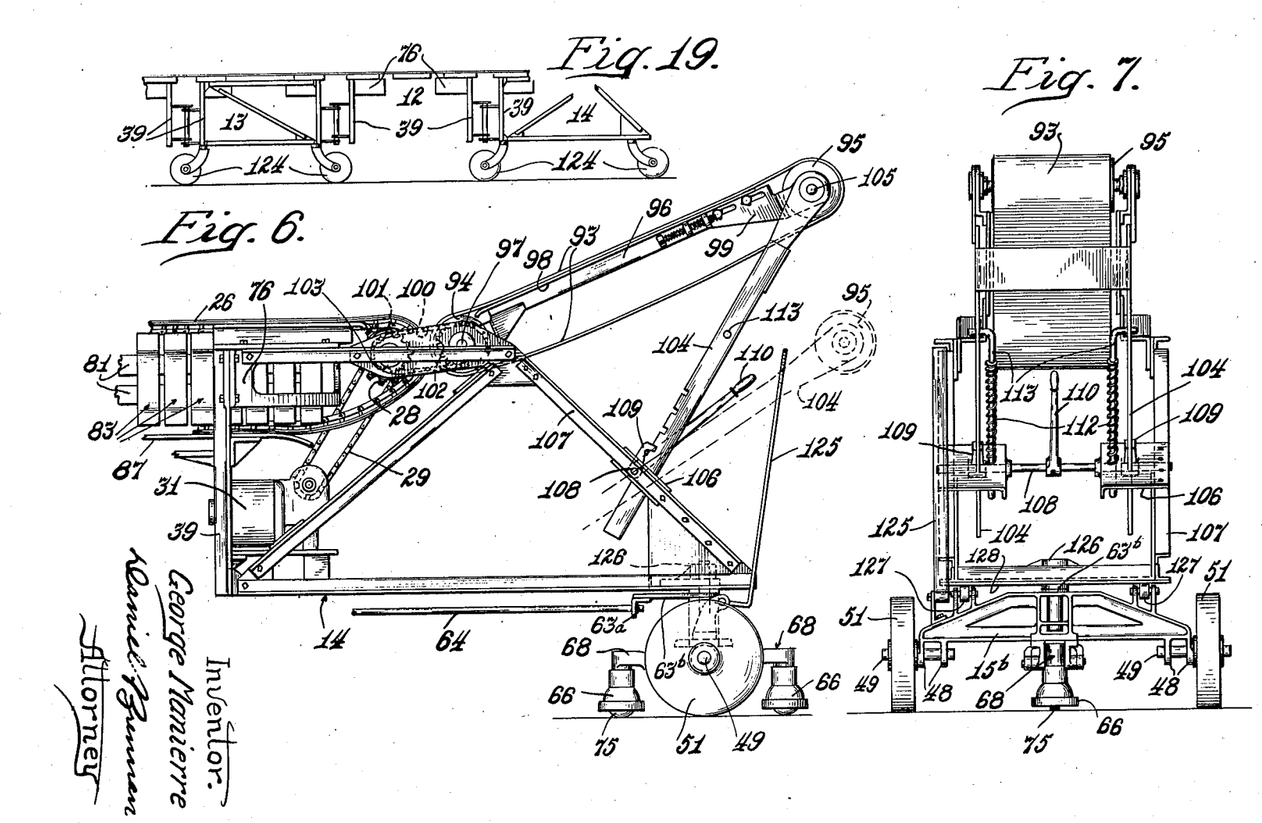
Fig. 6 is a side elevational view, similar to Fig. 5, showing the discharge end of the machine.
Fig. 7 is an end view of the discharge end of the machine.
Fig. 19 is a fragmentary side elevational view of a conveyer machine mounted on castors.

Articles carried forward on the chain-conveyer 26 are deposited on a power operated belt-conveyer 93 mounted on the front end of the discharge section 14. Referring particularly to the detail disclosure of the discharge section as illustrated in Figs. 6 and 7, the belt-conveyer 93 is trained over suitable rollers 94 and 95 journalled in a frame 96 pivotally mounted at one end, as at 97, on the discharge section 14. The frame 96 may be of any suitable construction but preferably includes a drag plate 98 and adjustable side plates 99, in which the front roller 95 is journalled, whereby the tension of the belt-conveyer may be adjusted. The belt-conveyer 93 preferably is driven by the chain-conveyer drive motor 31 on the discharge section, through a chain 100 trained over suitable sprockets 101—102 mounted respectively on the roller shaft 97 and chain-conveyer sprocket shaft 103.

The belt-conveyer frame 96 is held with its forward end elevated preferably by means of two notched bars 104, one journalled at one end at each end of the front roller shaft 105. The bars 104 extend through slots in plates 106 mounted one on each angle 107 of the discharge section 14. A rock shaft 108, journalled in said angles 107, beneath plates 106, carries two dogs 109, one for cooperative engagement with the notches in each bar 104. Disengagement of the dogs is accomplished by manipulation of an operating handle 110 on said rock shaft, whereby the belt-conveyer frame may be lowered into a substantially horizontal plane. When the belt-conveyer frame is in its lowered position, the entire conveyer machine may be moved rearwardly beneath a delivery chute 111 (Fig. 2). The belt-conveyer frame preferably is spring balanced by providing springs 112 on rods 113 associated one with each notch bar 104.

Any variation in the length of the upper flight of the chain-conveyer, due to pivoting or flexing of the conveyer frame, is taken up by mounting the shaft carrying idler sprocket 27 in suitable spring controlled take-up arms 114 (only one shown in Fig. 17) hence the upper flight always remains taut and buckling or binding is avoided. Warping and twisting of the chain-conveyer is prevented by the three point support for each section of the conveyer frame resulting from the provision of single wheeled power trucks and two wheeled idler trucks. Also, were two wheels provided on the power trucks a differential necessarily would be required.

Figure 17:
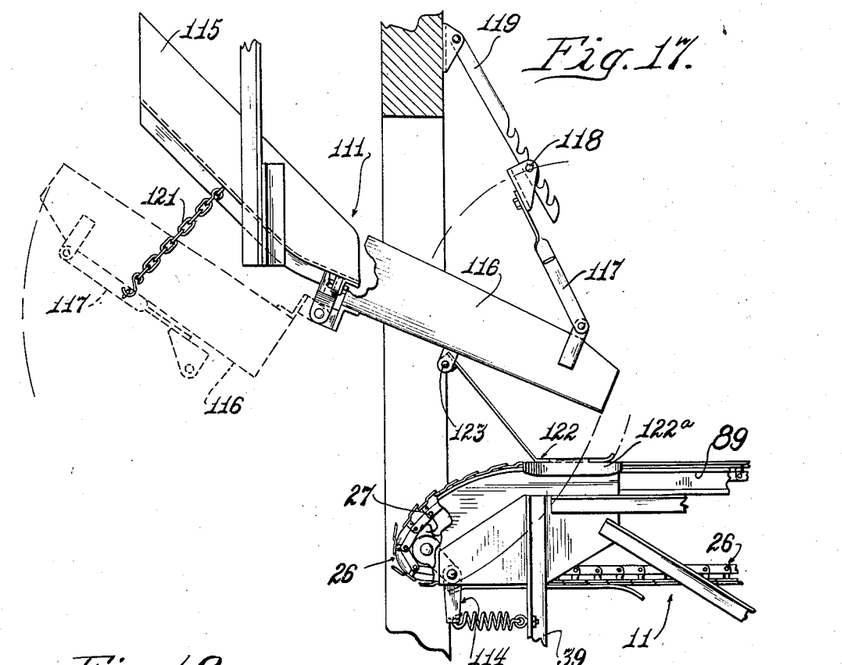
Fig. 17 is an enlarged elevational view of the delivery chute and a fragment of the conveyer machine.
Figure 18:
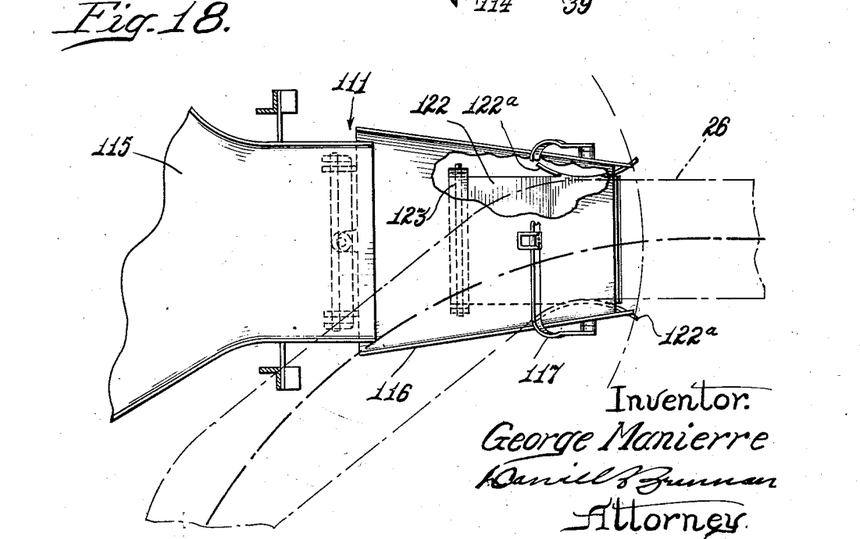
Fig. 18 is a plan view of the chute.

The loader chute 111, best shown in Figs. 17 and 18, preferably consists of a rigid portion 115 and a horizontally and vertically hinged extension 116. A bail 117, hingedly connected to the extension 116, carries a hanger pin 118 for detachable engagement with a notched hanger bar 119 whereby the extension may be supported at various elevations. Upon detaching the bail from the hanger bar, the extension may be swung into the dotted line position shown in Fig. 17 and held in such position by a chain 121.

The discharge end of the universally pivoted extension 116 is centered on the chain-conveyer irrespective of the position of said chain-conveyer relative to the rigid portion 115 by a guide shoe 122. As shown, the shoe 122 is hingedly mounted at 123 to the under side of the extension 116 and preferably has depending side margins 122a suitably arched to freely embrace the side edges of the chain-conveyer 26.

It is apparent that the conveyer machine, being extremely flexible, easy to handle, and provided with a conveyer frame and chain-conveyer which will not bind, buckle, warp or twist; is readily applicable to numerous types of installations. For example, it may be used, as described, as a general purpose conveyer and, if desired, the power and idler trucks may be replaced by swivel castors 124 as illustrated in Fig. 19.

To operate the conveyer machine (Figs. 1 and 2) the loader chute 111 is adjusted to the desired heighth and the hinge plate 22 is dropped onto the floor of the first car 23. The operator then closes a switch (not shown) preferably located at the discharge end to start the power truck motors. This moves the machine forward beneath the loader chute 111 and articles are then started down said chute onto the chain-conveyer passing therebeneath. The operator steers the discharge end of the machine, by means of a handle 125 on the discharge end, and guides it through the car door. The machine may be guided through a series of aligned cars, and into one end of the last one, as shown. The power truck motors are then stopped. During this movement of the conveyer machine, articles have continuously been deposited on the chain-conveyer and it is now filled over its entire length. The chain-conveyer motor 31 now is started and the articles are discharged off the front end of the chain-conveyer onto the now moving belt-conveyer, from which they are removed and stacked in the car end.

As the end of the car is loaded, the power truck motors are momentarily started in reverse, to back the conveyer machine out of the car a few feet at a time so that the articles are always discharged near the point of stacking. When one end of the car is loaded, the chain-conveyer motor is stopped and the machine is guided forward into the other end of the car. This movement of the whole machine again fills the chain-conveyer as it passes beneath chute 111. Loading of this car end proceeds in the same manner as the first, the chain and belt-conveyers operating to discharge a continuous stream of articles and the machine, as a whole, is gradually backed out. After the furthest car is filled the machine is backed into the next car and the loading operations repeated.

In many instances a string of cars 23 to be loaded are spotted along the loading platform 17 (Fig. 1) and it is necessary to move the machine from one door opening to the door opening of the next car. In such event the entire machine is backed onto the track 16 and the curved section 21 is removed and may be hung on the front end of the machine. The power truck motors are then started and the machine is guided from track 16 across the gap to track 16a. It then follows track 16a and track 21 is laid at the end of said track 16a to guide the machine through the adjacent doorway.

It should be noted that the loading operations are all controlled from the discharge end of the machine and that the machine follows the guide tracks while being moved, hence no operator is needed at the loading end of the machine. For unloading a car the machine may be reversed end to end with the loading end entering the car.

Although an exemplary form of the improved universally flexible conveyer machine has been shown in detail in the accompanying drawings, and described in detail in the foregoing specification, it is to be understood; that, the disclosure is one of example and not limitation and; that, it is not desired to be restricted to the precise details but to embrace such variations as may fall within the spirit of the invention and the scope of the appended claims.

I claim:

1. In a machine of the character described, in combination, a plurality of sections pivotally connected end to end providing an elongated flexible conveyer frame, trucks supporting said sections, said trucks being pivotally mounted between said sections one in axial alignment with each pivotal connection and one at each end of said conveyer frame, and means associated with said trucks to limit pivoting of the trucks to one-half of the pivotal movement of the adjacent sections.

2. In a machine of the character described, in combination, a plurality of sections pivotally connected end to end providing an elongated flexible conveyer frame, trucks supporting said sections, said trucks being pivotally mounted between said sections one in axial alignment with each pivotal connection and one at each end of said conveyer frame, and a spring rod extending substantially the entire length of the conveyer frame co-acting with the trucks to limit pivoting of said trucks to one-half of the pivotal movement of the adjacent sections.

3. In a machine of the character described, in combination, a conveyer frame consisting of a plurality of sections connected end to end for substantially horizontal pivotal movement relative to each other, trucks supporting said frame sections, said trucks being pivotally mounted between said sections one in axial alignment with each pivotal connection and one at each end of said conveyer frame, means operatively associated with said trucks to limit turning of the trucks to one-half of the turning movement of the adjacent sections, and a power operated universally flexible endless chain-conveyer guided along said conveyer frame.

4. In a conveyer machine, in combination, a plurality of sections pivotally connected end to end for limited pivotal movement substantially in a horizontal plane relative to each other, trucks supporting said sections, said trucks being pivotally mounted between said sections one in axial alignment with each pivotal connection and one at the free end of each end section, and means connecting said trucks to limit pivoting of the trucks.

5. In a conveyer machine, the combination of, a plurality of substantially rectangular sections pivotally connected end to end for limited pivotal movement relative to each other, substantially in a horizontal plane, pivotally mounted trucks supporting said sections, and means to limit pivoting of the trucks about their mounting.

6. In a conveyer machine, in combination, a plurality of sections, a hinge structure including a vertically disposed shaft connecting adjacent sections end to end whereby each section is movable in a horizontal plane relative to its adjacent section, trucks supporting said sections, said trucks being mounted for rotation one about each shaft, guides on each truck, and a spring rod common to all of said trucks extending through said guides to resist yieldably independent pivotal movement of said trucks and to return them to their initial positions after pivoting.

7. In a conveyer machine, the combination of, an elongated flexible conveyer frame consisting of a plurality of spaced apart sections pivotally connected end to end, a power operated endless universally flexible chain-conveyer mounted on said conveyer frame, with means to guide said chain-conveyer at said pivotal connections, said means comprising, a bracket in the end of each section, a flexible strap secured at one end in one of said brackets, the other end being slidable in the opposed bracket, and a plurality of chain guiding members carried by said strap between said brackets.

8. A conveyer machine comprising, in combination, a plurality of sections pivotally connected end to end, a universally flexible chain-conveyer carried on said sections, horizontally flexible means bridging adjacent sections at each pivotal connection to guide said chain-conveyer, and a vertically flexible bed on each alternate section to support said chain-conveyer, the other sections being substantially rigid.

9. A conveyer machine comprising, in combination, a plurality of pivotally connected sections providing a flexible conveyer frame, a power operated endless chain-conveyer mounted on said conveyer frame, wheeled trucks supporting said sections, a track, spaced vertical flanges on said track, and horizontally disposed guide rollers on said trucks to co-operate with said flanges to positively guide the trucks along said tracks while moving the conveyer frame.

10. In a conveyer machine having a plurality of sections pivotally connected end to end for horizontal pivoting relative to each other, certain of said sections being vertically flexible, wheeled trucks supporting said machine, said trucks being pivotally mounted one in axial alignment with the pivotal connection between each section and one at each end of the machine, a track to guide movement of said machine, horizontally disposed rollers mounted on each truck to engage in said track, and yieldable means to retain said rollers in said track.

11. A conveyer machine comprising, in combination, an elongated flexible conveyer frame consisting of a plurality of sections pivotally connected to end, an endless universally flexible chain-conveyer carried on and extending from the rear end to substantially the front end of said frame, means to guide said chain-conveyer at the pivotal connections, a power operated conveyer on the front end of said conveyer frame, and means to hold said second conveyer in an upwardly inclined position, said means being operable to lower said second conveyer into substantially a horizontal position.

12. A conveyer machine comprising, in combination, a plurality of frame sections pivotally connected end to end providing a flexible conveyer frame, a universally flexible conveyer on said frame, each alternate frame section being vertically flexible, one-wheeled power trucks one mounted for horizontal rotation on the axis of alternate pivotal connections, and two-wheeled idler trucks one mounted for horizontal rotation on the axis of the other pivotal connections and one at the free end of each end section, said alternately arranged trucks providing a three-point support for each of said frame sections.

13. A conveyer machine comprising, in combination, a plurality of frame sections pivotally connected end to end providing a flexible conveyer frame, a universally flexible conveyer on said frame, each alternate frame section being vertically flexible, one-wheeled power trucks one mounted for horizontal rotation on the axis of alternate pivotal connections, and two-wheeled idler trucks one mounted for horizontal rotation on the axis of the remaining pivotal connections and one at the free end of each end section.

14. A conveyer machine comprising, in combination, a plurality of sections pivotally connected end to end, each alternate section being vertically flexible, one-wheeled power trucks one mounted for horizontal rotation on the axis of alternate pivotal connections, and two-wheeled idler trucks one mounted for horizontal rotation on the axis of the remaining pivotal connections and one at the free end of each end section.

15. A conveyer machine comprising, in combination, a plurality of sections pivotally connected end to end, each alternate section being vertically flexible, one-wheeled power trucks one mounted for horizontal rotation on the axis of alternate pivotal connections, and two-wheeled idler trucks one mounted for horizontal rotation on the axis of the remaining pivotal connections.

GEORGE MANIERRE.